(12) United States Patent
Guyan et al.

(10) Patent No.: US 10,426,226 B2
(45) Date of Patent: *Oct. 1, 2019

(54) FOOTWEAR UPPER WITH DYNAMIC AND LOCK-OUT REGIONS

(71) Applicant: Under Armour, Inc., Baltimore, MD (US)

(72) Inventors: Alan Guyan, Baltimore, MD (US); David McManus, Portland, OR (US); John Acevedo, Portland, OR (US); Alan Toronjo, Portland, OR (US)

(73) Assignee: Under Armour, Inc., Baltimore, MD (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/436,499

(22) Filed: Feb. 17, 2017

(65) Prior Publication Data

US 2017/0156443 A1 Jun. 8, 2017

Related U.S. Application Data

(63) Continuation-in-part of application No. 15/386,975, filed on Dec. 21, 2016, now Pat. No. 9,949,518,
(Continued)

(51) Int. Cl.
| | |
|---|---|
| *B32B 3/26* | (2006.01) |
| *A43B 23/02* | (2006.01) |
| *A45F 3/12* | (2006.01) |
| *A45F 3/04* | (2006.01) |
| *A45F 3/00* | (2006.01) |

(52) U.S. Cl.
CPC .......... *A43B 23/027* (2013.01); *A43B 23/026* (2013.01); *A43B 23/028* (2013.01); *A43B 23/0215* (2013.01); *A43B 23/0245* (2013.01); *A45F 3/12* (2013.01); *A45F 3/04* (2013.01);
(Continued)

(58) Field of Classification Search
CPC ....................................................... B32B 3/266
See application file for complete search history.

(56) References Cited

U.S. PATENT DOCUMENTS

| | | |
|---|---|---|
| 4,668,557 A | 5/1987 | Lakes |
| 4,809,690 A | 3/1989 | Bouyssi |
| (Continued) | | |

FOREIGN PATENT DOCUMENTS

| | | |
|---|---|---|
| FR | 2876879 | 4/2006 |
| JP | 10072719 A | 3/1998 |
| (Continued) | | |

OTHER PUBLICATIONS

European Search Report from EU Application No. 13179068, dated Nov. 20, 2013.

*Primary Examiner* — William P Watkins, III
(74) *Attorney, Agent, or Firm* — Maginot, Moore & Beck LLP

(57) ABSTRACT

An article of apparel includes a base layer and an auxetic layer coupled to the base layer. The auxetic layer includes an auxetic structure defining a repeating pattern of shapes, with each of the shapes defined by perimeter walls and an interior recess. The auxetic layer includes a first region and a second region. Each interior recess in the first region provides a void exposing the base layer, and each interior recess in the second region is at least partially filled with a recess material.

20 Claims, 13 Drawing Sheets

Related U.S. Application Data which is a continuation of application No. 14/137,038, filed on Dec. 20, 2013, now Pat. No. 9,538,798, which is a continuation-in-part of application No. 13/838,827, filed on Mar. 15, 2013, now Pat. No. 9,629,397.

(60) Provisional application No. 62/296,190, filed on Feb. 17, 2016, provisional application No. 61/695,993, filed on Aug. 31, 2012.

(52) U.S. Cl.
CPC . *A45F 2003/001* (2013.01); *Y10T 428/24273* (2015.01)

(56) References Cited

U.S. PATENT DOCUMENTS

| | | | |
|---|---|---|---|
| 5,334,903 A | 8/1994 | Smith |
| 5,661,854 A | 9/1997 | March |
| 5,937,441 A | 8/1999 | Raines |
| 6,029,376 A | 2/2000 | Cass |
| 6,247,181 B1 | 6/2001 | Hirsch |
| 6,539,556 B1 | 4/2003 | Barker |
| 6,783,814 B2 | 8/2004 | Swager |
| 6,878,320 B1 | 4/2005 | Alderson |
| 6,989,075 B1 | 1/2006 | Kao |
| D521,191 S | 5/2006 | Berger |
| 7,160,621 B2 | 1/2007 | Chaudhari |
| 7,247,265 B2 | 7/2007 | Alderson |
| 7,252,870 B2 | 8/2007 | Anderson |
| 7,350,851 B2 | 4/2008 | Barvosa-Carter |
| 7,455,567 B2 | 11/2008 | Bentham et al. |
| 7,650,648 B2 | 1/2010 | Roberts |
| 7,858,055 B2 | 6/2010 | Lee |
| 7,824,763 B2 | 11/2010 | Namburi |
| 7,896,294 B2 | 3/2011 | Dittrich |
| 7,910,193 B2 | 3/2011 | Ma |
| 7,989,057 B2 | 8/2011 | Alderson |
| 8,074,418 B2 | 12/2011 | Thiagarajan |
| 8,084,117 B2 | 12/2011 | Lalvani |
| 8,304,355 B2 | 11/2012 | Baldauf |
| 8,436,508 B2 | 5/2013 | Kombluh |
| 2002/0132543 A1 | 9/2002 | Baer |
| 2005/0035031 A1 | 2/2005 | Alderson |
| 2005/0159066 A1 | 7/2005 | Alderson |
| 2006/0129227 A1 | 6/2006 | Hengelmolen |
| 2007/0031667 A1 | 2/2007 | Hook |
| 2007/0093768 A1 | 4/2007 | Roe |
| 2007/0213838 A1 | 9/2007 | Hengelmolen |
| 2007/0286987 A1 | 12/2007 | Anderson |
| 2008/0011021 A1 | 1/2008 | Starbuck |
| 2008/0032598 A1 | 2/2008 | Bentham |
| 2008/0248710 A1 | 10/2008 | Wittner |
| 2009/0041978 A1 | 2/2009 | Sogard |
| 2009/0119820 A1 | 5/2009 | Bentham |
| 2009/0239049 A1 | 9/2009 | Hook |
| 2009/0265839 A1 | 10/2009 | Young |
| 2010/0029796 A1 | 2/2010 | Alderson |
| 2010/0107317 A1 | 5/2010 | Wang |
| 2010/0305535 A1 | 12/2010 | Leeming |
| 2010/0306904 A1 | 12/2010 | Neid |
| 2011/0029063 A1 | 2/2011 | Ma |
| 2011/0039088 A1 | 2/2011 | Lee |
| 2011/0046715 A1 | 2/2011 | Ugbolue |
| 2011/0059291 A1 | 3/2011 | Boyce |
| 2011/0144417 A1 | 6/2011 | Jagger |
| 2011/0155137 A1 | 6/2011 | Martin |
| 2011/0156314 A1 | 6/2011 | Alberg |
| 2011/0159758 A1 | 6/2011 | Martin |
| 2011/0168313 A1 | 7/2011 | Ma et al. |
| 2011/0209557 A1 | 9/2011 | Burns |
| 2011/0214560 A1 | 9/2011 | Skertchly |
| 2011/0236519 A1 | 9/2011 | Skertchly |
| 2011/0250383 A1 | 10/2011 | Summers |
| 2011/0252544 A1 | 10/2011 | Abernethy |
| 2011/0265714 A1 | 11/2011 | Lee |
| 2011/0281481 A1 | 11/2011 | Alderson |
| 2011/0282452 A1 | 11/2011 | Koerner |
| 2012/0029537 A1 | 2/2012 | Mortarino |
| 2012/0055187 A1 | 3/2012 | Raines |
| 2012/0060991 A1 | 3/2012 | Mun |
| 2012/0066820 A1 | 3/2012 | Fresco |
| 2012/0129416 A1 | 5/2012 | Anand |
| 2013/0071583 A1 | 3/2013 | Evans |
| 2013/0134992 A1 | 5/2013 | Zhu |

FOREIGN PATENT DOCUMENTS

| | | |
|---|---|---|
| JP | 2007138320 A | 6/2007 |
| WO | 2010082537 S1 | 7/2010 |
| WO | 2012069787 | 5/2012 |

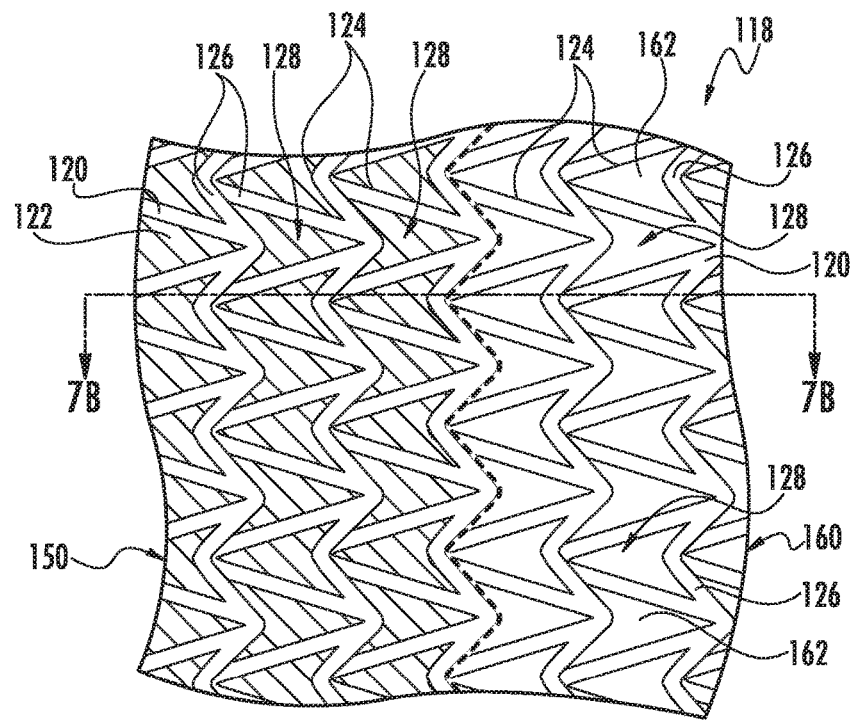
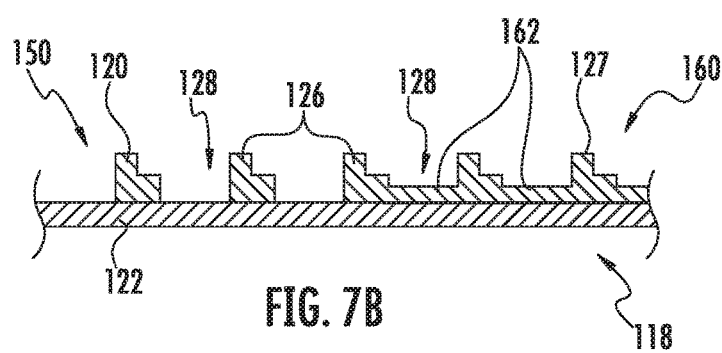

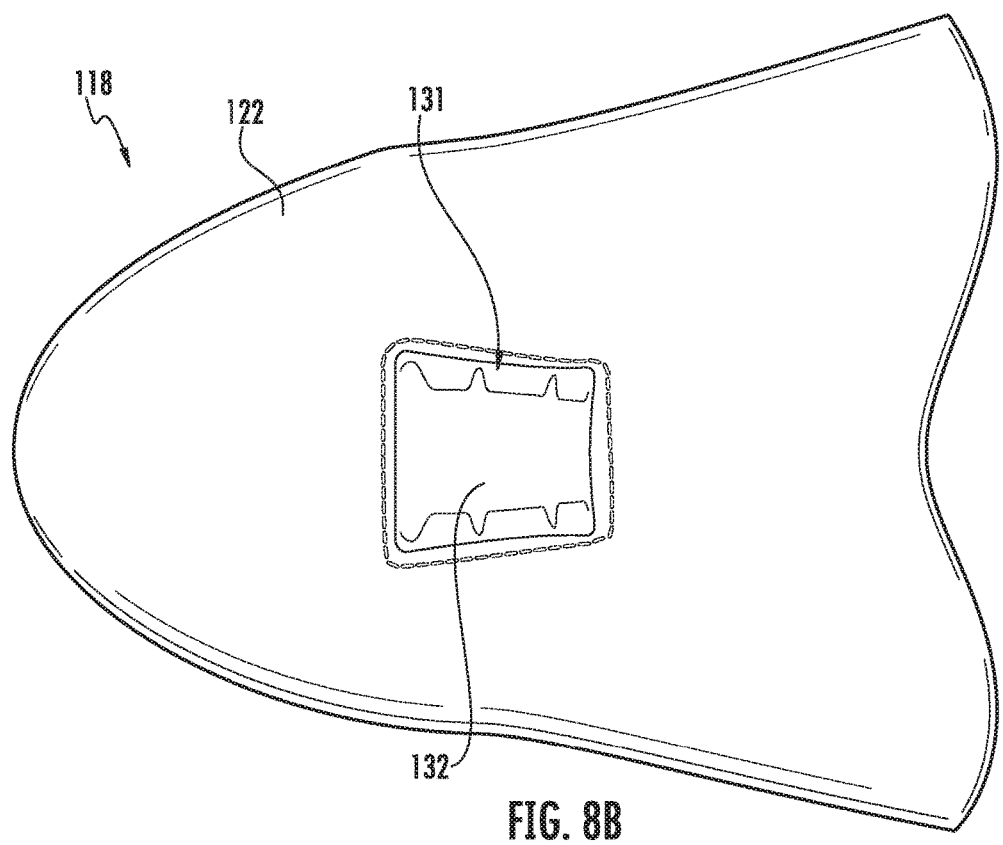

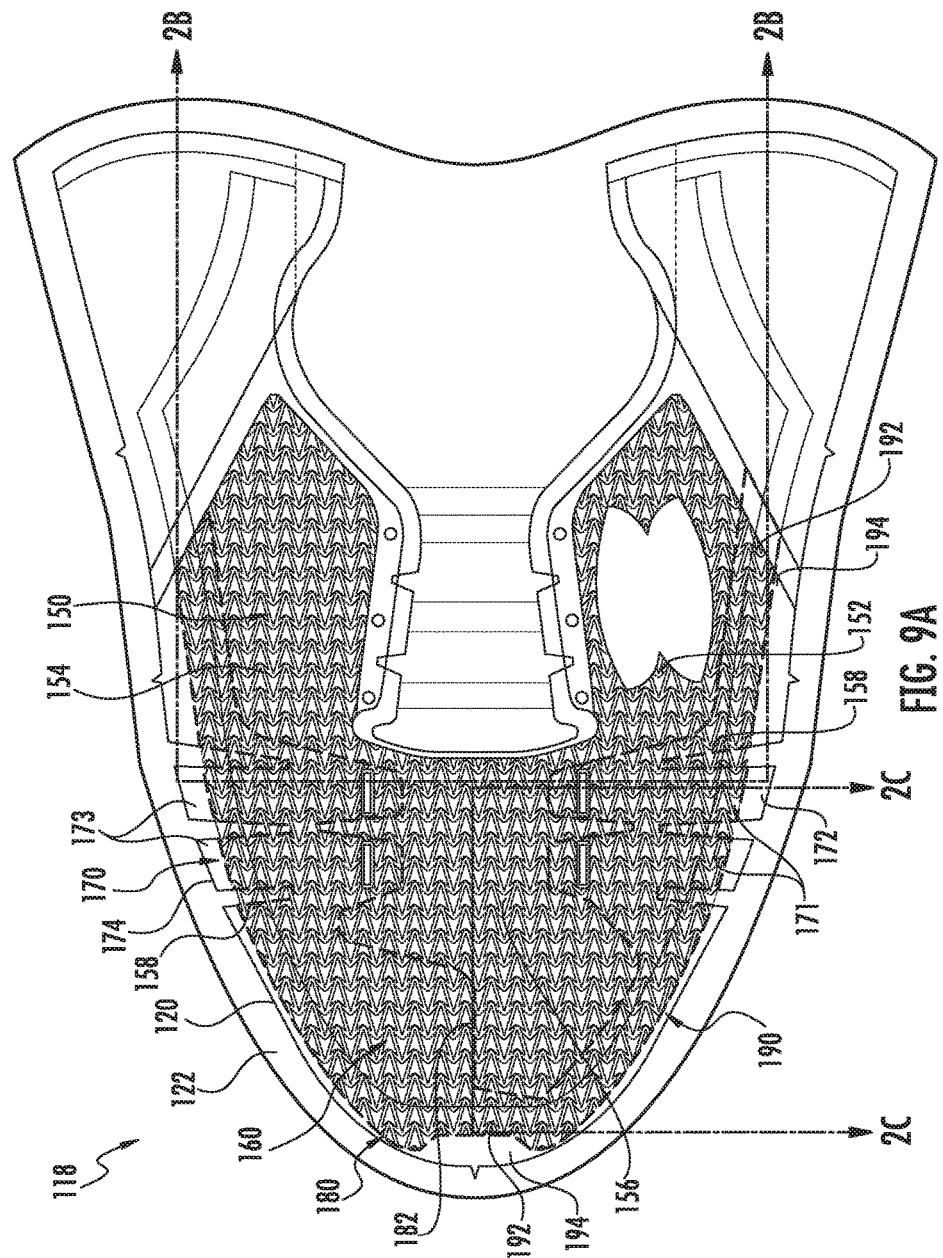

FOOTWEAR UPPER WITH DYNAMIC AND LOCK-OUT REGIONS

CROSS-REFERENCE TO RELATED APPLICATIONS

This application claims priority from U.S. Provisional Patent Application No. 62/296,190, filed Feb. 17, 2016, and is a continuation-in-part of U.S. application Ser. No. 15/386,975, filed Dec. 21, 2016, which is a continuation of U.S. application Ser. No. 14/137,038, filed Dec. 20, 2013, which is a continuation-in-part of U.S. application Ser. No. 13/838,827, filed Mar. 15, 2013, which claims priority from U.S. Provisional Patent Application No. 61/695,993, filed Aug. 31, 2012. The disclosure of each of the aforementioned applications is incorporated herein by reference in its entirety.

FIELD

This document relates to the field of apparel, including footwear, and structures for incorporation into the articles of apparel.

BACKGROUND

Many garments and other articles of apparel are designed to fit closely to the human body. When designing an article of apparel for a close fit to the human body, different body shapes and sizes must be considered. Different individuals within a particular garment size will have different body shapes and sizes. For example, two individuals wearing the same shoe size may have very differently shaped feet, including very different heel, midfoot and forefoot dimensions. These variable measurements between similarly sized individuals makes proper design of closely fitting garments difficult.

In addition to accounting for different body measurements for different individuals within a size, various contours of the human body must also be considered when designing closely fitting articles of apparel. These contours of the human body often include various double curvature surfaces. Spheroids, bowls, and saddle-backs are all examples of surfaces having double curvatures. If an article of apparel is not properly sized for a particular wearer, the wearer may experience undesirable tightness or looseness at various locations. Such an improper fit may result in discomfort, excessive wear, buckling, bending or creasing of the garment at the poorly fitting locations.

Another consideration when designing articles of apparel is the stress, strain and other forces that will be applied to particular regions of the article of apparel, depending upon the use of the article of apparel. For example, a shoe that is used for cross training purposes will experience forces that are significantly different from a shoe that is used exclusively for running. Thus, it is difficult to design a shoe or other article of apparel that offers good performance characteristics when used for various different purposes.

The contour and fit of a particular of apparel may be further complicated by coupling arrangements such as lacing arrangements, zippers, and buttons which draw opposing seams toward one another and couple them together. In particular, because fastening arrangements draw two opposing sides together, there is often buckling and creasing in the area of the fastening arrangement when the sides are drawn together, and this can lead to discomfort and undesirable tightness to the wearer.

In view of the foregoing, it would be desirable to provide a shoe or other article of apparel capable of conforming to various foot or body shapes within a given size range. It would also be desirable to provide a shoe or other article of apparel that is capable of conforming to various double curvatures on the human body and generally providing a good fit. Furthermore, it would be advantageous if such a shoe or other article of apparel could be designed to offer good performance characteristics for multiple uses, such as a cross-training shoe that offer good performance characteristics when the shoe is used for any of a number of different athletic training purposes. Also, it would be advantageous to provide a shoe including a fastening arrangement adapted to reduce buckling and discomfort to a wearer when the fastening arrangement is drawn together. In addition, it would be desirable for such a garment or article of apparel to be relatively inexpensive and easy to manufacture.

SUMMARY

An article of footwear includes an upper with a functional laminate including a textile layer and a polymer layer. The textile layer possesses a first expansion (stretch) pattern, while the polymer layer possesses a second expansion pattern. The functional laminate is configured such that, under load, the polymer layer dominates the structure expansion pattern of the textile layer to control expansion of the structure. The textile layer, furthermore, dominates the polymer layer upon removal of the load to drive retraction of the structure. In an embodiment, the polymer layer is defined by a plurality of open and closed cells operable to create localized expansion patterns along the upper.

In accordance with one exemplary embodiment of the disclosure, there is provided an article of apparel comprising a base layer and an auxetic layer coupled to the base layer. The auxetic layer comprises an auxetic structure defining a repeating pattern of shapes, each of the shapes is defined by perimeter walls and an interior recess. The auxetic layer includes a first region and a second region, wherein each interior recess in the first region provides a void exposing the base layer, and wherein each interior recess in the second region is at least partially filled with a recess material.

In accordance with another exemplary embodiment of the disclosure, there is provided an article of apparel comprising a base layer and an auxetic structure coupled to the base layer. The auxetic structure includes a plurality of interconnected members forming an array of cell units. Each of the plurality of interconnected members forms cell walls with interior recesses defined within the cell walls. The array of cell units includes at least one dynamic region wherein the interior recesses expose the base layer and at least one lockout region wherein a fill in the interior recesses covers the base layer.

In accordance with yet another exemplary embodiment of the disclosure, there is provided an article of footwear including a sole and an upper connected to the sole. The upper includes a base layer and an auxetic layer connected to the base layer. The auxetic layer includes an auxetic structure defining a repeating pattern of shapes, each of the shapes defined by perimeter walls with an interior recess provided within each shape. The auxetic structure further includes a first region and a second region. Each interior recess in the first region provides a void exposing the base layer. Each interior recess in the second region is at least partially filled with a recess material.

The above described features and advantages, as well as others, will become more readily apparent to those of ordinary skill in the art by reference to the following detailed description and accompanying drawings. While it would be desirable to provide an article of apparel that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 7A shows an enlarged plan view of an auxetic panel provided on the article of footwear of FIG. 5;

FIG. 7B shows a cross-sectional view of the auxetic panel of FIG. 7A along line B-B of FIG. 7A;

FIG. 8B shows a bottom view of the vamp panel of FIG. 8A;

FIG. 9A shows a plan view of an alternative embodiment of the vamp panel of FIG. 8A;

Like reference numerals have been used to identify like elements throughout this disclosure.

DESCRIPTION

Figure 1A:
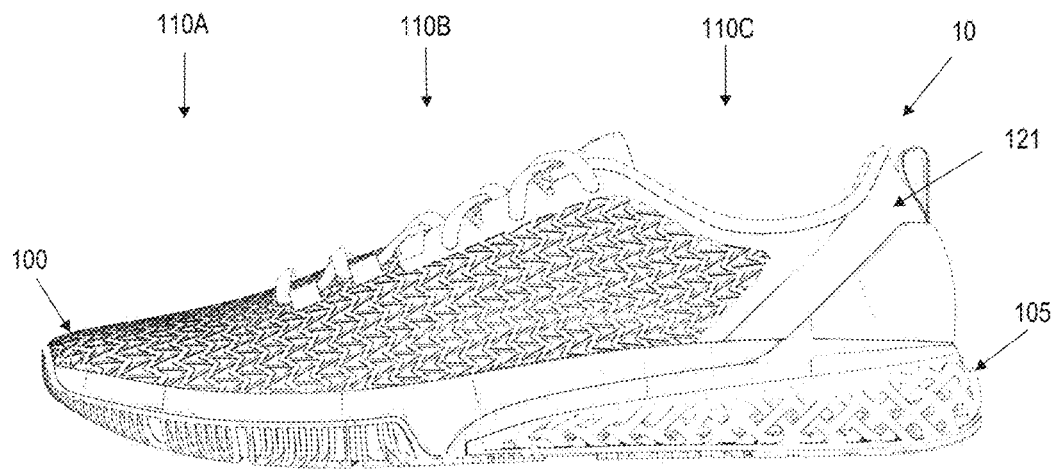
FIG. 1A is a side view of an article of footwear in accordance with an embodiment of the present invention.
Figure 1B:
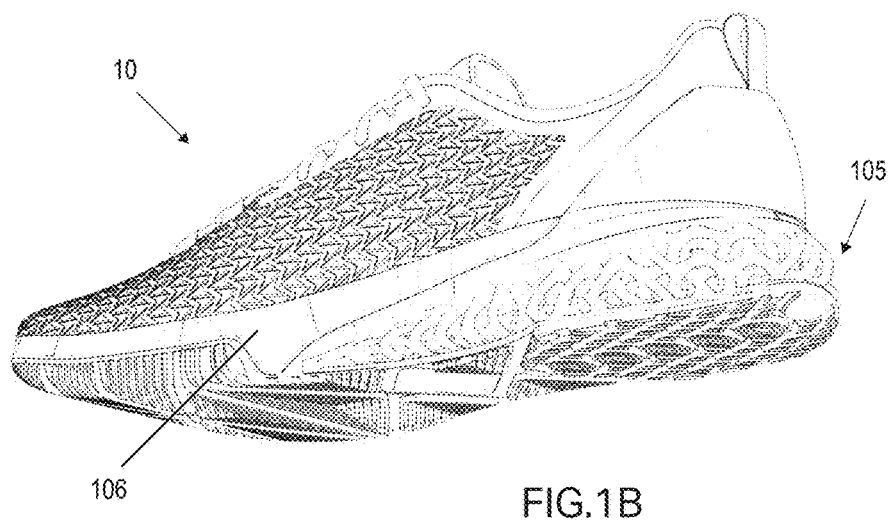
FIG. 1B is a rear perspective view of the article of footwear of FIG. 1.
Figure 1C:
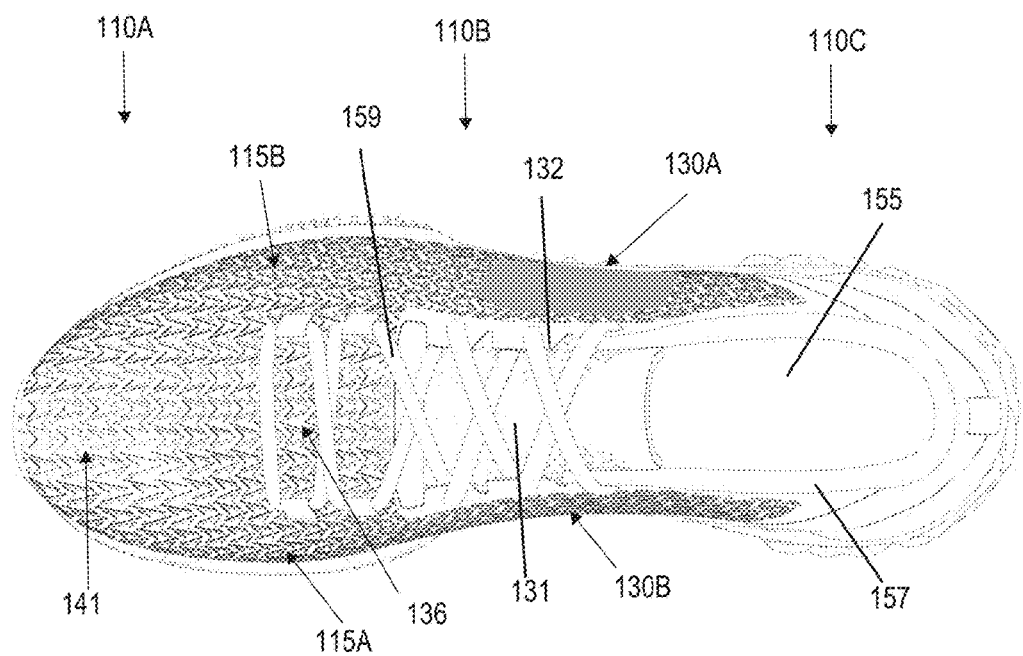
FIG. 1C is a top plan view of the article of footwear of FIG. 1.
Figure 1D:
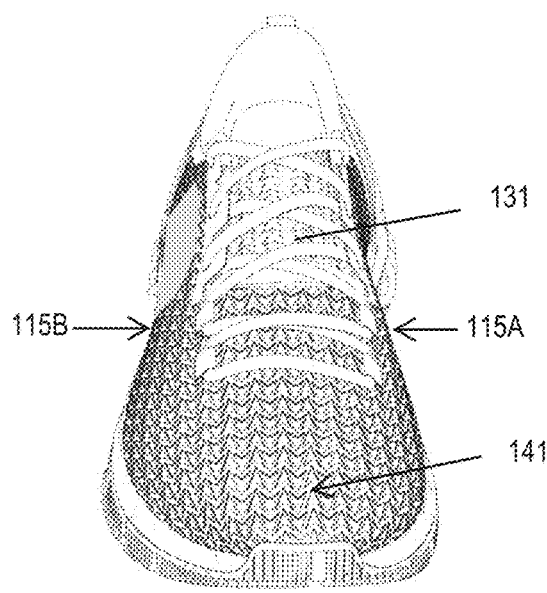
FIG. 1D is a front view in elevation of the article of footwear of FIG. 1.
Figure 1E:
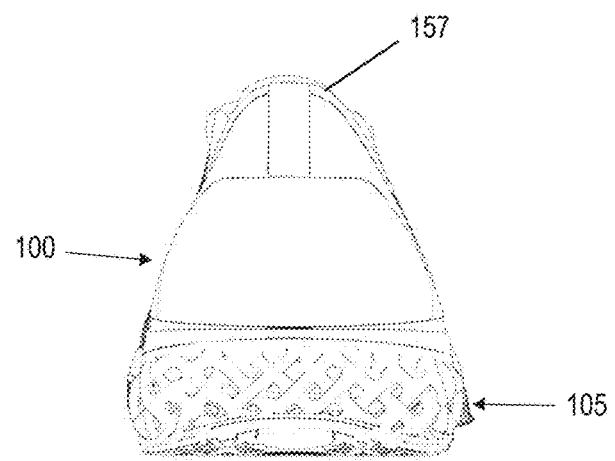
FIG. 1E is a rear view in elevation of the article of footwear of FIG. 1.
Figure 1F:
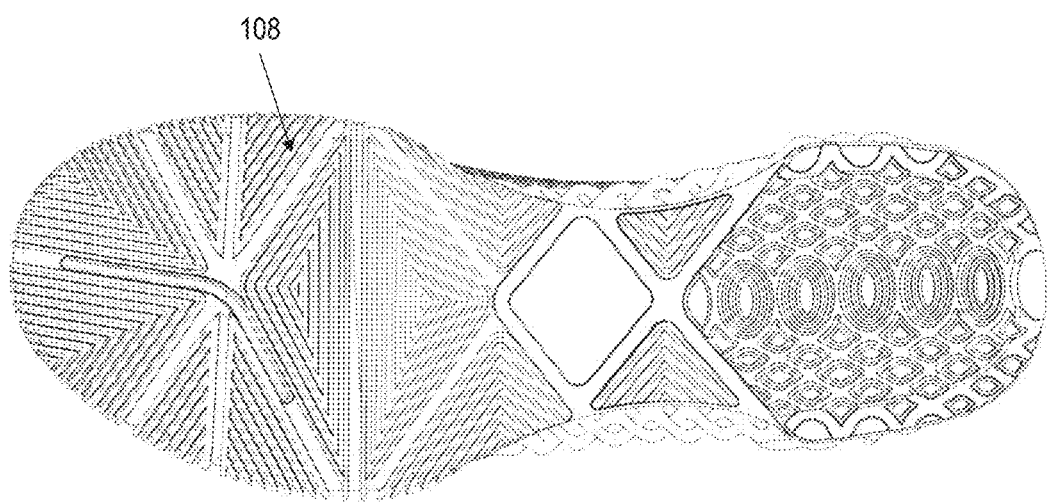
FIG. 1F is a bottom plan view of the article of footwear of FIG. 1.

With reference to FIGS. 1A-2B, an article of apparel is shown in the form of an article of footwear 10. Referring to FIGS. 1A-1F, the article of footwear 10 is an athletic shoe (e.g., a cross-training shoe) including an upper 100 coupled to a sole assembly 105 (e.g., connected via an adhesive, stitching, etc.). The article of footwear 10 defines a forefoot region 110A, a midfoot region 110B, and a hindfoot region 110C, as well as a medial side 115A and a lateral side 115B. The forefoot region 110A is configured to align generally with (be positioned proximate to) the ball and toes of the foot, the midfoot region 110B is configured to align generally with the arch and instep areas of the foot, and the hindfoot region 110C is configured to align generally with the heel and ankle areas of the foot. Additionally, the medial side 115A is oriented along the medial (big toe) side of the foot, while the lateral side 115B is oriented along the lateral (little toe) side of the foot.

The upper 100 includes a plurality of sections that cooperate to define a foot cavity. Specifically, a heel section 121 includes heel cup configured to align with and cover the calcaneus area of a human foot. A lateral quarter section 130A, disposed forward the heel section 121, is oriented on the lateral shoe side 115B. Similarly, a medial quarter section 130B, disposed forward the heel section 121, is oriented on the medial shoe side 115A. A vamp section 136 is disposed forward the quarter sections 130A, 130B and a toe cage section 141 is disposed forward the vamp section. The upper 100 may further include tongue 132 disposed within a tongue slot 131 configured to align with and span the instep area of the foot.

The sole assembly 105 typically includes an insole (not shown), a midsole 106, and an outsole 108, which together cushion and protect the user's foot while the user makes contact with the ground. The sole assembly may be a conventional sole assembly, or, as illustrated, may include a mechanical cushioning system as disclosed in U.S. application Ser. No. 15/149,661, the disclosure of which is incorporated herein by reference in its entirety.

With this configuration, the heel 121, lateral quarter 130A, medial quarter 130B, vamp 136, toe cage 141, and tongue 132 cooperate with the sole assembly 105 to define a foot cavity into which a human foot is inserted by way of an access opening 155 bounded by a collar 157. The foot may be secured within the cavity utilizing a fastening device 159 such as a lacing system, a cable system, a hook and loop fastener, etc.

Functional Laminate

All or part of the upper is formed from a functional laminate having a predetermined expansion pattern. The functional laminate includes base or textile layer and a polymer layer coupled (e.g., connected, mounted, laminated, etc.) to the textile layer. The textile layer includes a plurality of strands interconnected via weaving, kitting, braiding, or via a nonwoven process. The strands forming the textile may be any natural or synthetic strands suitable for their described purpose. The term "strand" includes one or more filaments organized into a fiber and/or an ordered assemblage of textile fibers having a high ratio of length to diameter and normally used as a unit (e.g., slivers, roving, single yarns, plies yarns, cords, braids, ropes, etc.). In a preferred embodiment, a strand is a yarn, i.e., textile fibers or filaments intertwined in a form suitable for knitting, weaving, or otherwise intertwining to form a textile fabric. A yarn may include a number of fibers twisted together (spun yarn); a number of filaments laid together without twist (a zero-twist yarn); a number of filaments laid together with a degree of twist; and a single filament with or without twist (a monofilament).

The strands, furthermore, may include elastic strands and/or an inelastic strands. An elastic strand is formed of elastomeric material; accordingly, it possesses the ability to stretch and recover by virtue of its composition. A specific example of an elastomeric material suitable for forming an elastic strand is an elastomeric polyester-polyurethane copolymer such as elastane, which is a manufactured fiber in which the fiber-forming substance is a long chain synthetic polymer composed of at least 85% of segmented polyurethane. In contrast, an inelastic is formed of a non-elastomeric material. Accordingly, by virtue of its composition, inelastic strands possess no inherent stretch and/or recovery properties. Hard yarns are examples of inelastic strands. Hard yarns include natural and/or synthetic spun staple yarns, natural and/or synthetic continuous filament yarns, and/or combinations thereof. By way of specific example, natural fibers include cellulosic fibers (e.g., cotton, bamboo) and protein fibers (e.g., wool, silk, and soybean). Synthetic fibers include polyester fibers (poly(ethylene terephthalate) fibers and poly(trimethylene terephthalate) fibers), polycaprolactam fibers, poly(hexamethylene adipamide) fibers, acrylic fibers, acetate fibers, rayon fibers, nylon fibers and combinations thereof.

It should be noted that an inelastic strand may be modified to possess a topology that enables the strand to provide mechanical stretch and recovery within the textile structure. For example, a hard yarn may be texturized (e.g., crimped) to generate stretch within the yarn.

Preferably, the textile layer is a resilient layer possessing stretch and recovery properties. That is, the textile structure possesses the ability to expand from its original shape/dimensions (stretch), as well as to contract, returning to its original shape/dimensions (recover). Accordingly, the textile layer expands when a tension is placed on the textile (e.g., along the machine direction and/or along the non-machine direction). The stretch of the textile may be directional. For example, the textile may possess four-way or two-way stretch capabilities. A textile with "four way" stretch capabilities stretches in a first direction and a second, directly-opposing direction, as well as in a third direction that is perpendicular to the first direction and a fourth direction that is directly opposite the third direction. In other words, a sheet of four-way stretch material stretches in both crosswise and lengthwise. A material with "two way" stretch capabilities, in contrast, stretches to some substantial degree in the first direction and the second, directly opposing direction, but will not stretch in the third and fourth directions, or will only stretch to some limited degree in the third and fourth directions relative to the first and second directions (i.e., the fabric will stretch substantially less in the third and fourth directions than in the first direction and second directions). In other words, a sheet of two-way stretch material stretches either crosswise or lengthwise.

Regardless of the direction of the stretch, during expansion, the textile will possess an expansion pattern. Specifically, textiles generally exhibit a strongly positive Poisson ratio. Thus, when a load or tension is applied to textile (along an axis), the normal stretch pattern causes the textile to constrict along the axis that is perpendicular to the load axis. Stated another way, the expansion pattern of the textile layer is anticlastic, contracting in the directions transverse to the direction of stretching. Upon release of the tension/load, the recovery power of textile returns the fabric to its original shape/dimensions.

The polymer layer is formed of a flexible, elastomeric polymer such as thermoplastic polyurethane or rubber (foamed or non-foamed). The polymer layer is applied to the textile layer such that any movement of the polymer layer generates movement in the textile layer, and vice versa. By way of example, the polymer layer may be directly applied to the textile in a liquid or gelatinous state such that the polymer infiltrates the textile, flowing between the strands. By way of example, the layer may be applied via flow molding. By way of further example, the polymer layer may be applied via screen printing (e.g., three dimensional screen printing) or an additive manufacturing process (3D printing techniques). In other embodiments, the polymer may be applied in non-solid form and cured. In still other embodiments, the polymer layer is formed separately (e.g., via selective laser sintering/ablation) and is adhered to the base layer via, e.g., an adhesive, welding, etc.

The polymer layer includes a plurality of cells or sub-structures arranged in an array. The cells are polygons including one or more internal angles that are reflexive (possessing a value between 180°-360°). In other words, the cells are reentrant polygons. Individual cells may be open cells or closed cells. Open cells have a central void that exposes the textile layer. Closed cells lack a void, i.e., material spans the cell to cover the textile layer. With this configuration, the open cells will expand under load, changing its shape to increase in size/dimensions. The closed cells either open to a lesser extent or not all. In this manner, dynamic regions and lockout regions can be defined within the upper, controlling its expansion pattern (discussed in greater detail below).

The cell array is a unitary (one piece or monolithic) structure of interconnected cells, with a cell sharing common borders with adjacent cells. Specifically, the plurality of cells forming the array is organized in a series of columns. In some embodiments (FIG. 2A), the cells of adjacent columns are oriented in opposite directions. In other embodiments (FIG. 3A), the cells of adjacent columns are oriented along the same direction, but are longitudinally offset such that cells of a first column are staggered relative to the cells of a second, adjacent column. By way of example, the upper end of one cell is oriented proximate the longitudinal center (equator) of its adjacent cell. With either configuration, the cell array is configured such that movement of one cell generates movement in an adjacent cell.

The expansion pattern of the polymer layer differs from the expansion pattern of the textile layer. For example, while the normal stretch pattern of the textile layer is to constrict along the axis that is perpendicular to the load axis, the polymer layer (or portions thereof) may either resist constriction or expand along the axis perpendicular to the load axis. For example, the polymer layer may be synclastic or auxetic, exhibiting a negative Poisson's ratio.

The polymer is coupled (e.g., mounted) onto the textile layer to form the textile laminate, with the textile layer being generally coextensive with the textile layer. In areas including open cells, the polymer layer is discontinuous. In areas including closed cells, the polymer layer is continuous. The polymer layer, moreover, is configured to control the textile layer during expansion, altering the expansion pattern of the fabric in areas including the open and/or closed cells. That is, during expansion of the functional laminate, the power of the polymer layer is generally stronger than the power of the textile layer; consequently, the expansion pattern of the polymer layer dominates the expansion pattern of the textile layer. Accordingly, the polymer layer drives the expansion of the textile layer in a predetermined pattern that differs from the textile layer's native expansion pattern to that of the polymer layer. With this configuration, the open cells may define dynamic regions, altering the expansion layer of the textile layer to a first degree, while the closed cells may define lockout regions, altering the expansion pattern of the textile layer to a second (different) degree (discussed in greater detail below).

Accordingly, when coupled to the textile layer, the polymer layer (the cell array) may work to resist deformation and shrinkage in the textile layer. Specifically, the polymer layer is configured to lower the Poisson ratio of the fabric, making the ratio of the functional laminate (the combined structure textile layer/polymer layer structure) less positive. In some embodiments, the Poisson ratio of the resulting functional laminate is less strongly positive. In other embodiments, it is zero; in others, it the Poisson ratio is negative. For example, the functional laminate (or portions thereof) may possess a negative Poisson's ratio, generating a synclastic or auxetic expansion pattern in which the function laminate expands along the axis perpendicular to the load axis (expands in directions transverse to the direction of stretching).

The textile layer, however, may possess greater recovery power than the polymer layer. Accordingly, upon removal of the load along the load axis, the textile layer dominates, drawing the polymer layer back to its contracted configuration. In this manner, each layer plays a role in the combined structure, driving expansion or contraction behavior of the laminate.

EXAMPLES

Figure 2A:
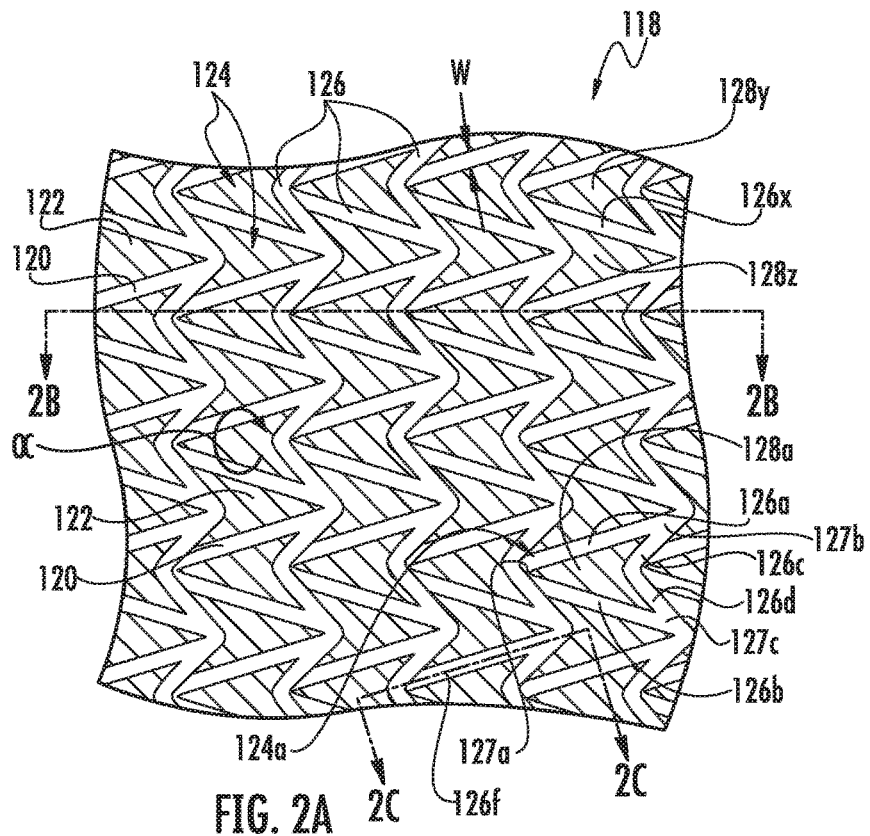
FIG. 2A shows an enlarged plan view of an auxetic panel including an auxetic layer forming a plurality of reentrant shapes.

Referring the embodiment of FIG. 2A, an enlarged view of the functional laminate 118 is shown. The functional laminate 118 includes the polymer or auxetic layer 120 and the textile or base layer 122. The auxetic layer 120 is connected to the base layer 122 and is generally arranged above or outwardly from the base layer 122. Accordingly, the outer surface of the auxetic layer 120 is exposed on the exterior of the upper 100, and an inner surface of the base layer 122 faces inwardly toward the foot cavity. For clarity in FIG. 2A, the base layer 122 is shown as the cross-hatched portion under the auxetic layer 120 which does not include any cross-hatching. Therefore, it will be recognized that the cross-hatching in FIG. 2A is for purposes of contrast only, and does not indicate any cross-section or particular material.

Figure 2B:
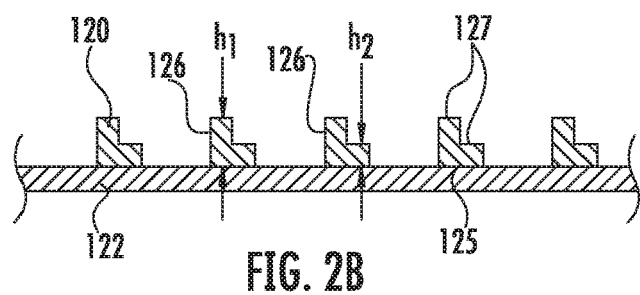
FIG. 2B shows a cross-sectional view of the auxetic panel of FIG. 2A along line B-B of FIG. 2A.
Figure 2C:
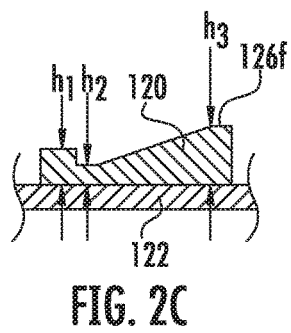
FIG. 2C shows a cross-sectional view of the auxetic panel of FIG. 2A along line C-C of FIG. 2A.

As indicated above, the auxetic layer 120 includes an auxetic structure provided by a plurality of interconnected segments 126 arranged in a manner to provide a repeating pattern of reentrant shapes (i.e., concave polygons). In the embodiment of FIG. 2A, the repeating pattern of reentrant shapes is an array of reentrant shapes which may be considered to exist in rows and columns of the auxetic structure. The interconnected segments 126 form the reentrant shapes in the auxetic structure, and an interior recess 128 is defined within each reentrant shape. In the embodiment of FIGS. 2A-2C, each interior recess 128 is generally void of material such that the base layer 122 is exposed on an outer side of the auxetic panel 118 through the internal recesses 128.

The reentrant shapes formed by the interconnected segments 126 may be any of various shapes capable of providing an auxetic structure. In the embodiment of FIGS. 2A-2C, the reentrant shapes formed by the interconnected segments are arrowhead shapes (which may also be referred to herein as "chevron" shapes). Segments 126a-126d in FIG. 2A illustrate a group of interconnected segments that form an arrowhead shape. Segments 126a and 126b are connected at a leading vertex 127a and form a first acute interior angle for the reentrant shape. Segments 126a and 126c are connected at a first trailing vertex 127b and form a second acute interior angle. Segments 126b and 126d are connected at a second trailing vertex 127c and form a third acute interior angle. Segments 126c and 126d are connected at a concave portion of the reentrant shape and form a reflexive interior angle.

Together, each set of interconnected segments 126 forming a reentrant shape and the associated interior recess 128 forms a cell unit 124. For example, in FIG. 2A, segments 126a-d and interior recess 128a forms cell unit 124a. While each cell unit has a unique interior recess 128, cell units may share the same segment 126. In other words, each segment 126 may border more than one interior recess 128. For example, in FIG. 2A, segment 126x borders interior recess 128y and 128z. Accordingly, it will be recognized that each segment 126 may be considered to be a part of multiple cells and, therefore, each segment 126 may be considered to a portion of two different reentrant shapes. Because the segments 126 surround an interior recess 128 in the auxetic structure, the segments 126 may also be referred to herein as "perimeter walls," "cell walls," or "interconnected members." In the embodiment of FIG. 2A, the auxetic structure includes an array of cell units which may be considered to exist in rows and columns of the auxetic structure. However, because each interconnected segment 126 may be shared by two different cell units 124, the area covered by the individual rows and columns overlaps within the auxetic structure.

In at least one embodiment, the auxetic layer 120 is a unitary structure, with each cell unit 124 sharing segments 126 with adjacent cell units. The segments 126 are integrally formed such that the material forming the segments 126 is continuous and uninterrupted across the auxetic structure. Accordingly, the auxetic structure may be formed using any of various processes capable for forming segments 126 as integral members, such as injection molding, three-dimensional printing, die-cutting the auxetic structure from a sheet of material, or any other appropriate process capable of producing the auxetic structure, examples of which are discussed in further detail below.

In the embodiment of FIG. 2A-2C, the integrally formed segments 126 are generally uniform in width (i.e., the distance across the segment parallel to the base layer 122), but are staggered in height. For example, as shown in FIG. 2A, each segment 126 has a width, w, which is generally uniform. In at least one embodiment, this width w is between 1 mm and 5 mm, and particularly about 2 mm.

As shown in FIG. 2B, each segment 126 has a height, h, defined between the top surface 127 and the bottom surface 125 of the segment 126. However, this height, h, is staggered across the auxetic layer 120 such that the height varies between different segments 126 and at different locations across each segment 126. In FIG. 2B, $h_1$ defines a height of the segments 126 forming the reflex interior angle (e.g., the reflex interior angle in cell unit 124a is at the intersection of segments 126c and 126d). Also, $h_2$ defines a height of the segments 126 at the first vertex (e.g., vertex 127a in cell unit 124a). Because $h_1$ is greater than $h_2$, it can be seen that the segments 126 are staggered in height across the auxetic layer 120. In at least one embodiment, $h_1$ is between 1 mm and 4 mm, and particularly about 2 mm. In this embodiment, $h_2$ is between 0.5 mm and 3 mm, and particularly about 1 mm. As shown in FIG. 2B, this staggered height difference between the segments 126 results in step features on the surface of the auxetic structure. In the embodiment of FIGS. 2A-2C, these step features are particularly shown where the first vertex of one cell unit 124 abuts the reflex interior angle of another cell unit 124.

In addition to height variations between different segments 126, each individual segment may also vary in height. For example, as shown in FIG. 2C, a single segment 126 may be tapered in height moving in a longitudinal direction along the segment. As shown in FIG. 2C, segment 126f has a height, $h_3$, at one end (e.g., near the second vertex) and a height, $h_2$, at the opposite end (e.g., near the first vertex). In at least one embodiment, $h_3$ is between 2 mm and 5 mm, and particularly about 3 mm. In this embodiment, $h_2$ is between 1 mm and 4 mm, and particularly about 2 mm. It will be recognized that the varying height of the segments results in some variations between cell units. For example, for segment 126f in FIGS. 2A and 2C, it will be noted that the portion of the segment having a height of $h_3$ forms a portion of the first apex for the cell unit in the row of arrowhead shapes pointing to the right in FIG. 2A (i.e., $h_3$ is at the leading edge of the arrowhead for the row of shapes pointing to the right). However, this same portion having a height of $h_3$ forms a portion of the second apex for the cell unit in the row of arrowhead shapes pointing to the left in FIG. 2A (i.e., $h_3$ is at the trailing edge of the arrowhead for the row of shapes pointing to the left). Thus it will be recognized that the cell units in the array have a slightly different structure from row to row of the array, with the leading edge of the arrowhead the highest point of the cell for all cell units pointing to the right, and the trailing edge of the arrowhead the highest point of the cell unit for all cell units pointing to the left.

The interconnected segments 126 of the auxetic layer 120 are formed from a wall material, which may be provided by any of various materials suitable for the desired purposes of the auxetic layer. In at least one embodiment, the wall material forming the interconnected segments 126 is provided by a resilient polymer material such as ethylene-vinyl acetate (EVA), a thermoplastic such as nylon, or a thermoplastic elastomer such as polyurethane. Each of these materials possesses elastomeric qualities of softness and flexibility. In another exemplary embodiment, the segments 126 are comprised of foam, such as a thermoplastic polyurethane (TPU) foam or an EVA foam, each of which is resilient and provides a cushioning effect when compressed. While EVA and TPU foam are disclosed herein as exemplary embodiments of the auxetic layer 120, it will be recognized by those of ordinary skill in the art that the auxetic layer 120 may alternatively be comprised of any of various other materials. For example, in other alternative embodiments, the auxetic layer may be comprised of polypropylene, polyethylene, XRD foam (e.g., the foam manufactured by the Rogers Corporation under the name PORON®), or any of various other polymer materials exhibiting sufficient flexibility and elastomeric qualities.

As noted previously, the segments 126 of the auxetic layer 120 may be formed in any of various methods. By way of example, the auxetic layer 120 is formed via a molding process such as compression molding or injection molding. By way of further example, the auxetic layer is formed via an additive manufacturing process such as selective laser sintering (SLS). In SLS, lasers (e.g., $CO_2$ lasers) fuse successive layers of powdered material to form a three dimensional structure. As yet another example, the auxetic layer 120 may be formed using a three-dimensional printing process.

The bottom surface 125 of the auxetic layer 120 is connected to the base layer 122, while the top surface 127 remains exposed on the auxetic panel 118. The auxetic layer 120 may be connected to the base layer 122 using any of various connection methods, including printing, fusing, heat transfer, adhesives, or any of various other connection methods as will be recognized by those of ordinary skill in the art. In at least one embodiment, the auxetic layer 120 is printed directly on to the base layer 122 using a three-dimensional printing process. Alternatively, the auxetic layer 120 may first be provided on a transfer sheet, and then a heat transfer method may be used to transfer the auxetic layer to the base layer 122.

In the exemplary embodiment of FIGS. 1A-2C, the interior recess 128 of each cell unit 124 in the auxetic layer 120 exposes the base layer 122 through the auxetic layer. However, in at least one embodiment, some of the interior recesses 128 in various regions of the auxetic panel 118 may be completely or partially filled with a recess material that partially or substantially fills the interior recess 128 at the interior portion of the cell between the perimeter walls (i.e., the segments 126). In the embodiments described below with reference to FIGS. 5-9, the recess material is the same material used to form the segments 126 of the auxetic layer 120. Filling the interior recess 128 with the same material as the segments 126 results in lockout regions where the expansive characteristics of the auxetic panel 118 are removed in these regions. However, in at least one embodiment, the recess material differs from the wall material forming the segments 126 of the auxetic layer. For example, the recess material may be a relatively resilient elastic material (e.g., a hot melt or other thermoplastic material). Filling the void with elastic material generally increases the resiliency of the auxetic structure but reduces the expansive characteristics typically associated with auxetic structures. In contrast, an internal recess 128 void of recess material results in a more expansive auxetic structure (compared to a filled interior recess).

As noted previously, the auxetic layer 120 is connected to the base layer 122. By way of example, the auxetic layer 120 may be an elastomer sheet bonded or otherwise directly connected to a stretch fabric base layer 122 such that the two layers 120 and 122 function as a unitary structure. To this end, the auxetic layer 120 may be connected to the base layer 22 via adhesives, molding, welding, sintering, stitching or any of various other means. In an embodiment, the auxetic layer 120 is brought into contact with the base layer 122 and then heat is applied to place the material forming the auxetic layer in a semi-liquid (partially melted) state such that material of the auxetic layer in contact with the base layer infiltrates the base layer fabric. Alternatively, the auxetic layer is applied in a molten or semi-molten state. In either application, once cooled, the auxetic layer 120 is securely fixed (permanently connected) to the fibers of the base layer 122 such that any movement of the base layer is transferred to the auxetic layer, and vice versa.

The structure of the auxetic panel 118, including the auxetic layer 120 and the base layer 122 provides improved contouring properties around a three-dimensional object compared to a structure including only the base layer. For example, when incorporated into an article of footwear 10, the vamp easily and smoothly conforms to the various shapes and curvatures present on the foot. The auxetic panel 118 is capable of double curvature forming synclastic and/or anticlastic forms when stretched. Double curvatures are prevalent along the length of the human foot. Accordingly, the auxetic panel 118 providing the vamp 116 will follow the curvatures of the foot with little to no wrinkling or folding visible to the wearer. Furthermore, the inherent features and characteristics of the auxetic panel 118 allow the vamp 136 to be provided as a single panel that extends across a wide region of the article of footwear 10.

While FIGS. 1A shows one embodiment of an auxetic panel 118 that may be used on the article of footwear 10, it will be recognized that the auxetic panel 118 may take a number of different forms. For example, in lieu of the auxetic layer 120 of FIGS. 2A-2C wherein the reentrant shapes are provided in the form of arrowhead shapes, the auxetic structure of FIGS. 3A-3C may be used, wherein the reentrant shapes are hourglass or bow-tie shapes (which may also be referred to as "auxetic hexagons"). Although the shapes formed by the interconnected segments 126 are different in FIG. 3A from the shapes formed in FIG. 2A, it will be recognized that both embodiments share a number of similarities. For example, the auxetic panel 118 in FIGS. 3A-3C also includes an auxetic layer 120 and a base layer 122. The auxetic layer 120 includes a plurality of interconnected segments 126 that form cells units 124 oriented in an array, each cell unit being positioned in horizontal rows and vertical columns. The interconnected segments 126 may have different widths, as noted by widths "w" and "x". An interior recess 128 is formed within each cell unit 124, with the interior recess 128 bordered by the surrounding interconnected segments 126. The width "y" across on of the interior recesses 128 is generally greater than the width "w" or "x" across one of the interconnected segments 126.

Figure 3A:
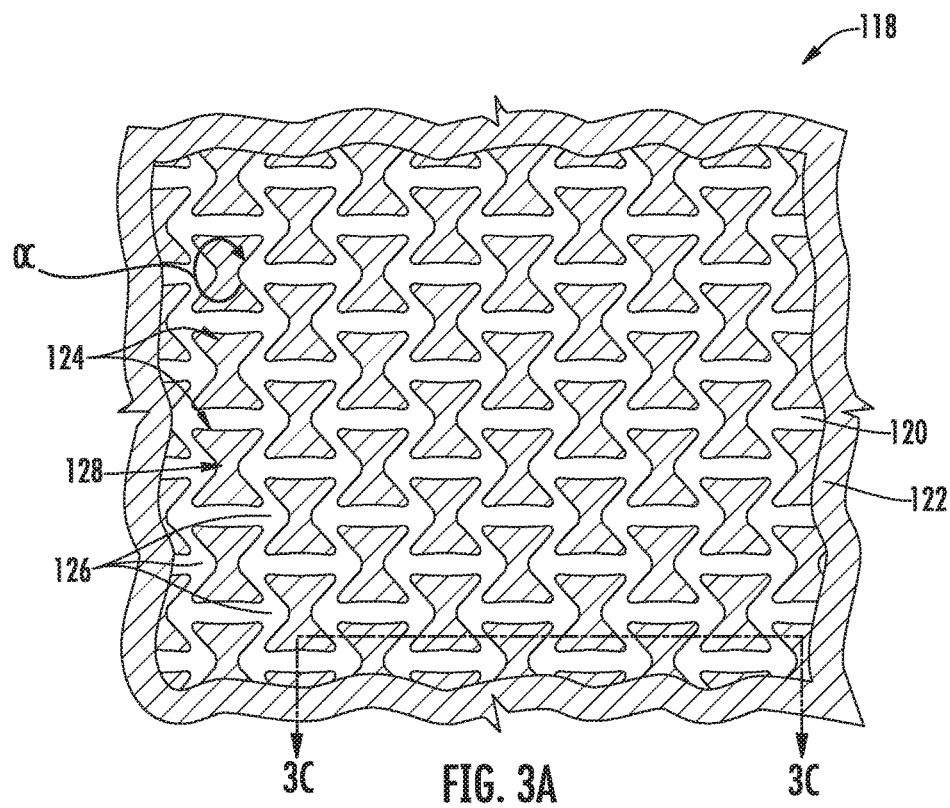
FIG. 3A shows an alternative embodiment of the auxetic panel of FIG. 2A.
Figure 3B:
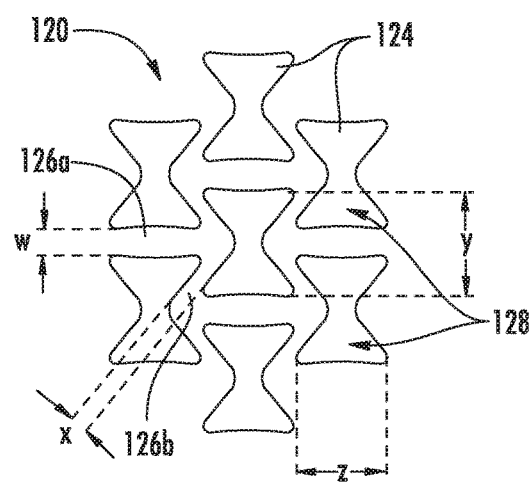
FIG. 3B shows an enlarged, schematic view of an auxetic layer of the auxetic panel of FIG. 4A, showing exemplary dimensions of the interconnected segments of the auxetic layer.
Figure 3C:
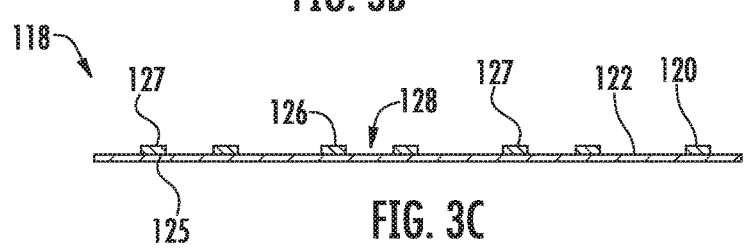
FIG. 3C shows a cross-sectional view of the auxetic panel of FIG. 3A.
Figure 4A:
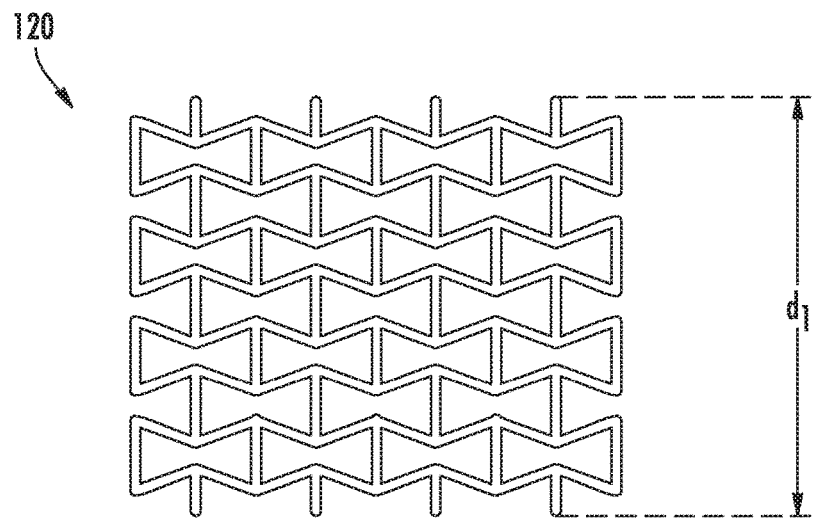
FIG. 4A shows a plan view of an auxetic layer of the auxetic panel of FIG. 3A in a contracted position.
Figure 4B:
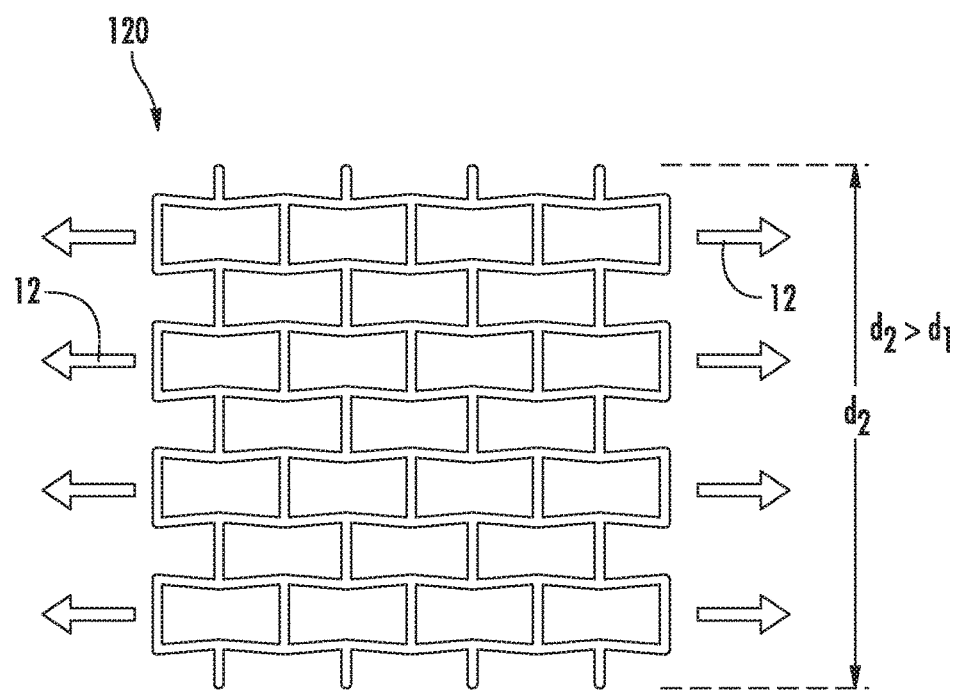
FIG. 4B shows a plan view of the auxetic layer of FIG. 4A in an expanded position.

FIG. 4A shows the auxetic layer 120 of FIG. 3A separated from the base layer 122 and in its normal, unstretched state. The thickness (or width) of the auxetic layer 120 in the unstretched state is indicated as d1. FIG. 4B shows the auxetic layer 120 stretched in the direction of arrows 12. The thickness of the auxetic layer in the stretched state is indicated by d2. As can be seen in FIG. 4B, when tension is applied along a first direction (indicated by arrows 12), the auxetic structure is stretched, expanding (i.e., becoming thicker) in a second direction (indicated by arrows 13) that is perpendicular to the first direction such that in the stretched state d2>d1. This is the result of the pivoting/rotation that occurs along the vertices of the reentrant shape (i.e., where the ends of the interconnected segments form corners of the polygons in the reentrant shape). It will be appreciated that the auxetic layer 120 of FIG. 2A is also configured to expand in a similar manner to the auxetic layer of FIG. 4A.

The term "auxetic structure" as used herein generally refers to a structure provided in a configuration that, depending on an appropriately flexible material being used, will have a near zero or negative Poisson's ratio. In other words, when stretched, auxetic structures tend to become thicker (as opposed to thinner) or expand in a direction perpendicular to the applied force, or at least do not contract to a significant extent in a direction perpendicular to the applied force. This generally occurs due to inherent hinge-like components between the interconnected segments which flex when stretched. In contrast, materials with a positive Poisson's ratio that is not near zero contract to a significant extent in a direction perpendicular to the applied outward force (i.e., perpendicular to the direction of stretch). As used herein, an auxetic structure having exhibiting a "near zero" Poisson's ratio is a structure exhibiting a Poisson's ratio of approximately zero and, in particular, less than +0.15.

The term "auxetic" as used herein is not limited to structures that actually have a near zero or negative Poisson's ratio in operation. The reason for this is that an entire auxetic structure, or portions thereof, may be practically locked in place and substantially prohibited from expansion or contraction in either direction. For example, a structure comprised of glass may still be considered an "auxetic structure" if it is provided with the appropriate array of reentrant shapes, although forces attempting to stretch the structure will typically result in the structure breaking rather than expanding. Also, components or materials adjacent to, within, or surrounding the auxetic structure may prevent the auxetic structure from exhibiting a near zero or negative Poisson's ratio when stretched. An example of an auxetic structure including regions that do not exhibit a zero or negative Poisson's ratio when stretched is described in further detail below with reference to the lockout region of the article of footwear.

In addition to the foregoing, it will be recognized that whether a structure has a negative Poisson's ratio, may depend upon the degree to which the structure is stretched. Structures may exhibit a negative Poisson's ratio up to a certain stretch threshold, but when stretched past the threshold may have a positive Poisson's ratio. For example, it is possible that when the auxetic layer 120 in FIG. 4A is stretched in the direction of arrows 12 past a threshold expansion position (e.g., past the state shown in FIG. 4B), the cells and segments of the auxetic structure may be stretched to an extent that the auxetic structure becomes slightly thinner (in the direction perpendicular to arrows 12) before the structure is torn apart or otherwise damaged.

In the embodiments disclosed herein, auxetic structures are formed from a plurality of interconnected segments 126 forming an array of cell units 124, and each cell unit has a "reentrant shape". As used herein, the term "reentrant shape" may also be used to refer to a "concave", or "non-convex" polygon or shape, which provides shape having an interior angle with a measure that is greater than 180°. The angle a shown in each of FIGS. 2A and 3A is an angle in a reentrant shape having a measurement of greater than 180°. The auxetic layers 120 in FIGS. 2A and 3A are two examples of such an auxetic structure defining a reentrant shape. It will be appreciated that numerous other auxetic structures defining reentrant shapes are possible.

With reference now to the embodiment of FIG. 5-7B, the article of footwear 10 is a shoe that includes an upper 100 made from an auxetic panel 118 including dynamic regions 150 as well as lockout regions 160. The article of footwear 10 is generally similar to the embodiment described above with reference to FIG. 1A and includes an upper 100 and a sole assembly 105 including a midsole 106 and an outsole 108. The auxetic panel 118 includes an auxetic layer 120 and a base layer 122. The auxetic layer 120 includes an auxetic structure provided by a plurality of interconnected segments 126 forming an array of cell units 124. Each of the interconnected segments 126 forms a portion of the cell walls for at least one cell unit 124. An interior recesses 128 is defined within the cell walls of each cell unit 124. In the dynamic regions 150 of the auxetic panel 118, the interior recesses 128 of the cell units 124 are void of material and expose the base layer 122. In the lockout regions 160 of the auxetic panel 118, fill 162 is provided in the interior recesses 128 of the cell units 124 which covers the base layer 122.

Figure 5:
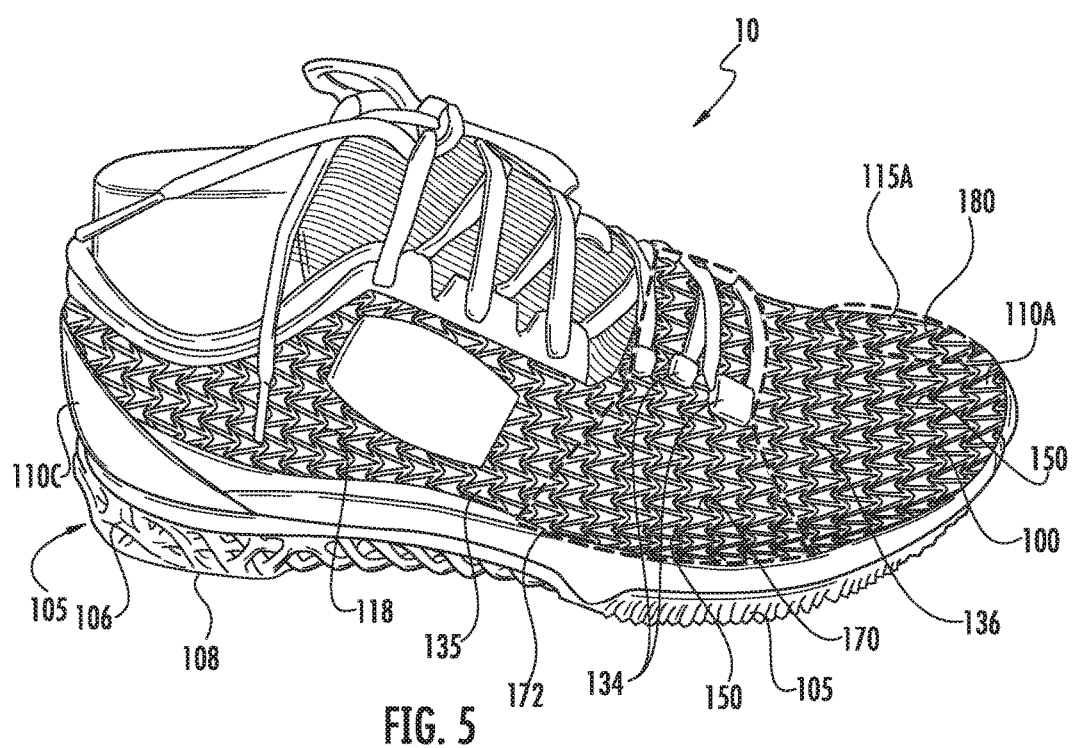
FIG. 5 shows a perspective view of an alternative embodiment of the article of footwear of FIGS. 1A-1F, the auxetic panel including dynamic regions and lockout regions.
Figure 6:
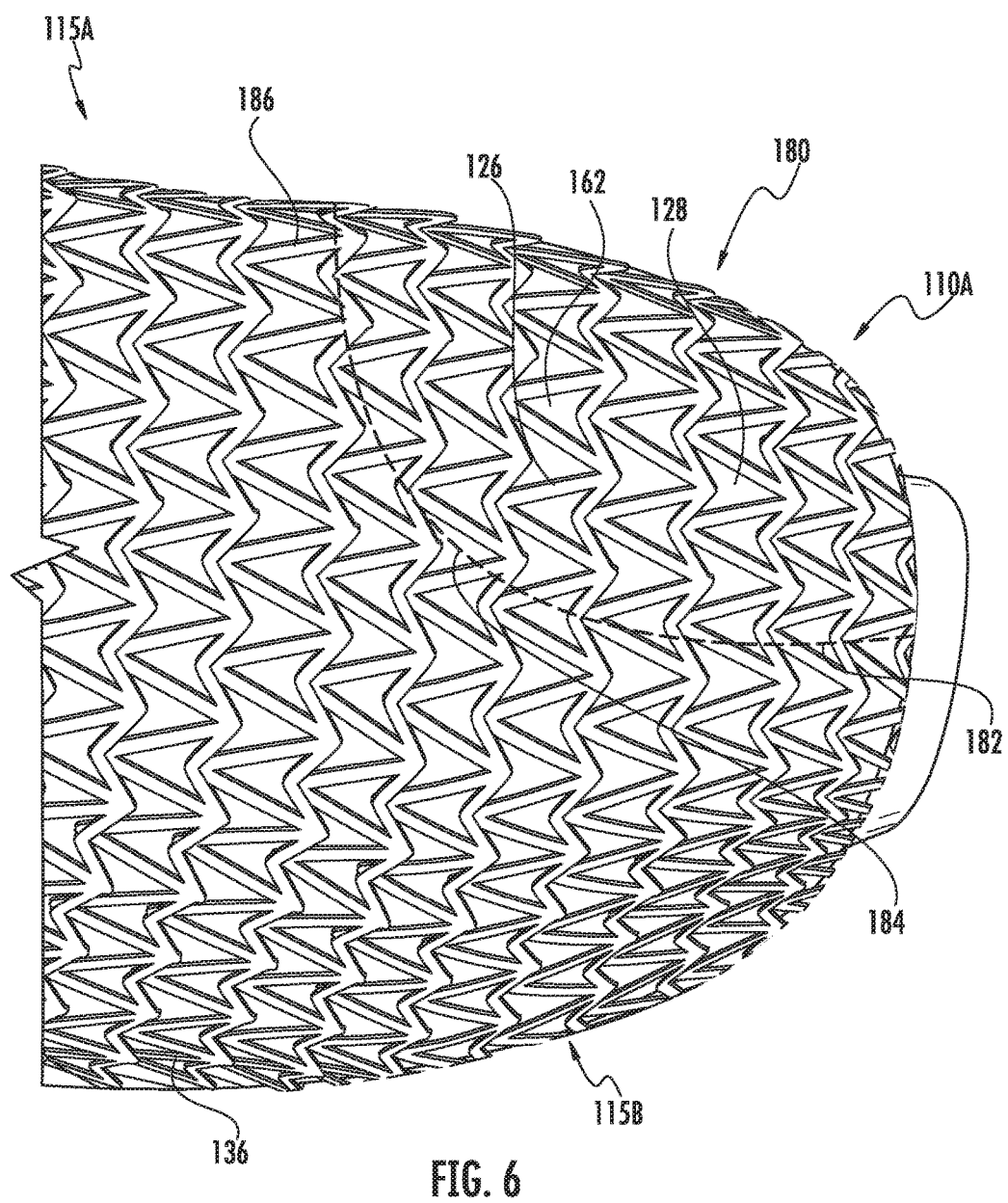
FIG. 6 shows an enlarged top view of a forefoot region of the article of footwear of FIG. 5.

With particular reference now to FIGS. 5 and 6, the auxetic panel 118 extends from a forefoot region 110A to a heel region 110C of the article of footwear 10. Most of the upper 100 is defines a dynamic region 150 of the auxetic panel 118. The lockout regions 160 cover more minor portions of the upper 100. These lockout regions 160 are illustrated in FIGS. 5 and 6 as those areas of the vamp 136 falling within the dotted lines. For example, the lockout regions in FIGS. 5 and 6 include a throat region 170 and a hallux region 180.

As shown in FIG. 5, the throat region 170 extends laterally across the vamp 136 in an area between the midfoot region 110B of the shoe 10 and the forefoot region 110A of the shoe. In particular, the throat region extends from a lateral edge 172 on the lateral side of the shoe where the sole 105 is connected to the upper 100, across the foremost lace mounts 134, and to a medial edge (not shown) on the medial side of the shoe where the sole is connected to the upper 100.

As best shown in FIG. 6, the hallux region 180 extends across an area of the vamp 136 that generally covers the big toe (i.e., the hallux) of the wearer. The hallux region 180 extends longitudinally from a center line 182 at the distal end of the forefoot region 110A to a second point 184 near a center of the forefoot region of the shoe. From the second point 184, the hallux region 180 extends in a medial direction to a third point 186 near the medial side of the shoe where the upper 100 is connected to the sole 105.

FIGS. 7A-7B show an enlarged view of the auxetic panel 118 in the article of footwear 10, showing a portion of the dynamic region 150 and a portion of the lockout region 160. In FIG. 7A, the border between the dynamic region 150 and the lockout region 160 is shown in dotted lines. The dynamic region 150 of the auxetic panel is a region that is similar to that described previously with reference to FIGS. 2A-2C. In particular, the dynamic region 150 includes a plurality of interconnected members 126 that form an array of cell units 124. Each cell unit 124 in the dynamic region 150 includes an interior recess 128 that is void of fill material and exposes the base layer 122. Accordingly, a user viewing the dynamic region 150 of the auxetic panel 118 from the side including the auxetic layer 120 (as shown in FIG. 7A) is able to also view the base layer 122 through the recesses 128 in the cell units. The base layer 122 is shown in cross-hatching in FIG. 7A to illustrate a contrast with the auxetic layer 120, and not to show a cross-section of any type.

With continued reference to FIGS. 7A and 7B, the lockout region 160 of the auxetic panel 118 is substantially the same as the dynamic region 150 but further includes a fill 162 in the interior recesses 128. Accordingly, the lockout region 160 also includes a plurality of interconnected members 126 that form an array of cell units 124. Each cell unit 124 defines an interior recess 128. The fill 162 is included in each interior recess 128, with the fill 162 at least partially filling the interior recess 128. In the disclosed embodiment, a sufficient amount of fill 162 is included in each interior recess 128 in the lockout regions such that the fill 162 covers the base layer 122 without extending to the top surface 127 of the interconnected segments 126. Because of the fill 162 in the recesses 128, a user viewing the lockout region 160 of the auxetic panel 118 from the side of the auxetic layer 120 shown in FIG. 7A is unable to see the base layer 122. Accordingly, in the lockout region 160 on the right side of FIG. 7A (i.e., the region to the right of the dotted lines), the base layer 122 is not shown and the fill 162 is shown in each interior recess 128.

The material used for the fill 162 may be any of a number of different materials. For example, as discussed previously, the fill 162 may be provided by a relatively resilient elastic material, such as a hot melt or other thermoplastic material. Alternatively, in the embodiment shown in FIGS. 7A-7B, the fill 162 is comprised of the same material as the wall material used to form the interconnected segments 126. For example, the fill may be provided by EVA, nylon, polyurethane, polypropylene, polyethylene, or any of various other polymer materials exhibiting sufficient flexibility and elastomeric qualities. In embodiments wherein the fill 162 is comprised of the same material as the interconnected segments 126, the fill 162 may be integrally formed with the interconnected segments 126. Thus, the fill 162 and the interconnected segments 126 in the embodiment of FIGS. 7A-7B are unitary in composition such that the fill 162 and the interconnected segments 126 form a unitary component with no seam or other division existing between the fill 162 and the interconnected segments 126. While the term "fill" is used herein to refer to a material positioned within the interior recesses 128 formed by the interconnected segments 126, it will be recognized that the fill 162 simply references a solid material within the interconnected segments 126 (i.e., a material other than air or other gas), regardless of whether the solid material completely covers the base layer 122 or completely fills the recesses 128.

The lockout regions 160 provide areas on the auxetic panel 118 that are less easily deformed than the dynamic regions 150 (i.e., the lockout regions 160 are less ductile than the dynamic regions 150). Therefore, when a force is applied to the auxetic panel 118, the dynamic regions 150 will stretch and deform more readily than the lockout regions 160. Accordingly, the lockout regions 160 are positioned on the auxetic panel 118 in locations where additional stability is desired. In the embodiment of FIGS. 5-6, the lockout regions 160 include the throat region 170 and the hallux region 180. The throat region 170 generally limits deformation of the vamp 116 in an area associated with the metatarsal zone of the foot, and thus prevents lateral and medial sliding of the foot in the forefoot region 110A and midfoot region 110B of the foot cavity. Similarly, the hallux region 180 generally prevents deformation of the vamp 136 in an area associated with the big toe, and thus limits movement of the big toe in the forefoot region of the foot cavity and prevents the big toe from poking through the auxetic panel 118. While the throat region 170 and the hallux region 180 are two examples of lockout regions 160, it will be appreciated that in other embodiments the lockout regions 160 may include additional or different regions.

Figure 8A:
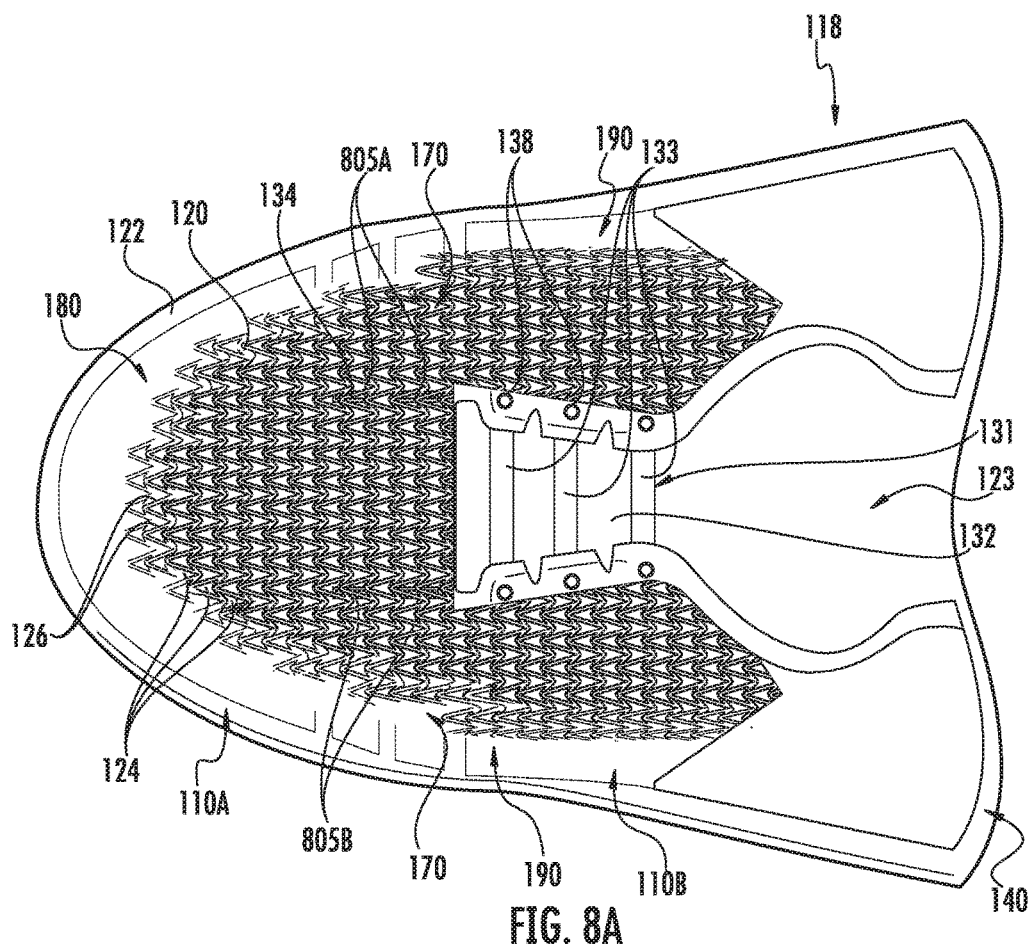
FIG. 8A shows a top view of a vamp panel for an alternative embodiment of the article of footwear of FIG. 5.

With reference now to FIGS. 8A-9, an alternative embodiment of an auxetic panel 118 configured for use as a vamp panel is shown. As shown in FIG. 8A, the auxetic layer 120 is shown connected to a base layer 122. The auxetic layer 120 is similar to the auxetic layer of the embodiments of FIGS. 5-7B and includes cell units 124 with cell walls 126 that form an array of reentrant shapes. The auxetic panel 118 includes both dynamic regions 150 and lockout regions 160. The lockout regions 160 include a throat region 170, a hallux region 180, similar to that described above, as well as a transition region 190.

With particular reference to FIG. 8A, the auxetic panel 118 is shown on the base layer 122 prior to removal of an exposed region 123 on the base layer that is cut away from the auxetic panel 118 prior to attachment of the auxetic panel 118 to the sole. As shown in FIG. 8A, in this embodiment, the auxetic structure of the auxetic layer 120 extends across a forefoot region 110A and a midfoot region 110B without extending to a heel region 110C of the auxetic panel 118. Four foremost lace mounts 134 in the form of oval openings are formed in the auxetic panel 118, including two foremost oval openings 805A on a medial side of the auxetic panel 118, and two foremost oval openings 805B on a lateral side of the auxetic panel 118. These oval openings provide a foremost location wherein the lace (not shown) is coupled to the upper 100. The oval openings may receive the lace itself or another member configured to retain the lace (e.g., a lace loop or eyelet). A number of opposing lace eyelets 138 are provided to the rearward side of the oval openings. The lace eyelets 138 are provided along the lateral and medial sides of a tongue opening 131 which is formed as a hole in the base layer 122 in a tongue region of the auxetic panel 118.

A tongue 132 extends across the tongue opening in the tongue region of the auxetic panel 118. As shown in both of FIG. 8A and 8B, the tongue 132 is connected to the base layer 122 in the tongue opening 131. The tongue 132 is not a freely moveable tongue but is instead fixedly connected to the base layer 122 along the forward, medial, and lateral sides. In FIGS. 8A and 8B, the tongue 132 is also connected to the base layer 122 on a rear side, but it will be recognized that this side of the base layer 122 is eventually removed to provide an opening to the foot cavity when the auxetic panel 118 is connected to the sole 105 of the shoe.

Although the tongue 132 is connected to the base layer 122 on multiple sides, it is comprised of a different material than the base layer 122. In at least one embodiment, the tongue 132 is comprised of a webbing such as a mesh material. The tongue 132 is generally breathable but less elastic than the base layer. Support strips 133 extend in a lateral direction across the tongue 132 between opposing lateral sides of the tongue opening. The support strips 133 are generally comprised of the same material as the interconnected segments 126 of the auxetic layer 120 and are integrally formed with the opposing lateral sides of the tongue opening 131. The support strips 133 provide additional support for the wearer in the midfoot region across the top of the foot.

FIG. 9A illustrates the locations of the dynamic regions 150 and the lockout regions 160 in the auxetic panel 118 of FIGS. 8A and 8B. The dotted lines in FIG. 9A illustrate the border between the dynamic regions 150 and the lockout regions. The dynamic regions include a medial dynamic region 154 adjacent to the medial side of the tongue opening, a lateral dynamic region 152 adjacent to a lateral side of the tongue opening, and a forefoot dynamic region 156 adjacent to the forward side of the tongue opening and extending through a metatarsal region of the shoe and into a toe region of the shoe. As noted previously, the auxetic panel 118 is the most ductile in these dynamic regions 150 and configured to expand the most in the dynamic regions 150 when a force is applied to the auxetic panel 118.

With continued reference to FIG. 9A, the lockout regions 160 include a throat region 170, a hallux region 180, and a transition region 190. All of the lockout regions 160 in FIG. 9A are interconnected and such that each lockout region 160 merges into another lockout region 160 and no single lockout region 160 is isolated from the other lockout regions. The throat region 170 generally includes a lateral side that includes two lateral arms 171, each lateral arm extending from a lateral edge 172 of the auxetic panel 118 to a position past (i.e., more central from) the oval openings 136a and 136b. The two lateral arms 171 are connected near midpoint of each arm. The throat region 170 also includes a medial side that includes two medial arms 173, each medial arm extending from a medial edge 174 of the auxetic panel 118 to a position past (i.e., more central from) the oval openings 805A and 805B. The two medial arms 173 are also connected near midpoint of each arm.

The hallux region 180 is positioned in the forefoot region of the shoe, and particularly in a toe region. The hallux region 180 is configured to cover the big toe of the wearer when the auxetic panel 118 is connected to a sole and the foot of a wearer is inserted into the foot cavity. The hallux region 180 generally extends from the medial side of the auxetic panel 118 to an approximate center line 182 of the auxetic panel, and from the foremost end of the auxetic panel 118 to a position near the metatarsal region of the auxetic panel 118. The hallux region 180 is connected to the foremost of the two medial arms 173 in the proximity of the metatarsal region.

The transition region 190 extends along the perimeter of the auxetic panel 118. The transition region 190 generally extends along the entire length of the perimeter from the lateral side, through the forefoot region, and to the medial side. As shown in FIG. 9A, the transition region is briefly interrupted at several locations along the perimeter by small dynamic region fingers 158 that extend inwardly on the auxetic panel 118 from the perimeter.

Figure 9B:
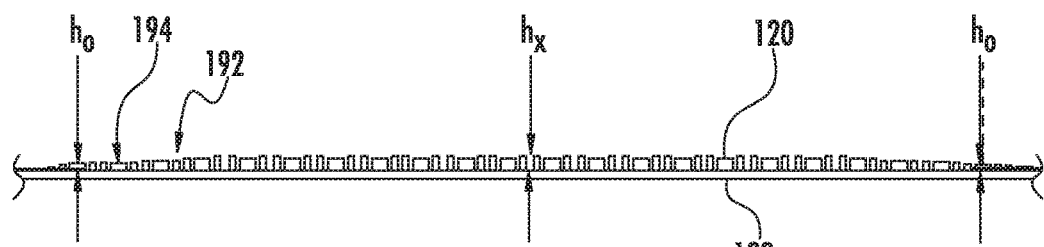
FIG. 9B shows a cross-sectional view of the vamp panel along line B-B of FIG. 9A.
Figure 9C:
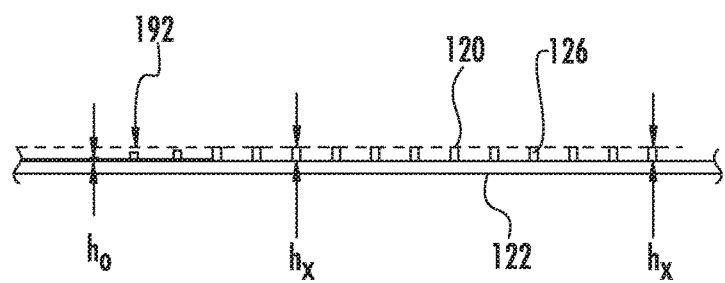
FIG. 9C shows a cross-sectional view of the vamp panel along line C-C of FIG. 9A.

The transition region 190 includes a taper zone 192 and a flat zone 194. The taper zone 192 is positioned to the inward side of the flat zone 194, and the flat zone 194 is positioned on the outermost perimeter of the transition region 190. In the taper zone 192, the height of the interconnected segments 126 of the auxetic panel gradually taper from a full height, $h_x$ to a fill height, $h_o$. Heights $h_x$ and $h_o$ are represented in FIG. 9A along cross-sections B-B and C-C, respectively shown in FIG. 9B and FIG. 9C. In each of FIGS. 9A and 9B, height $h_x$ represents the full height of the interconnected segments 126, which may be any of the various heights of the interconnected segments 126 at various locations on the auxetic panel 118, as discussed previously with reference to FIGS. 2B and 2B. Height $h_o$ represents a height of the interconnected segments 126 that is equivalent to the height of the fill 162. Because the height of the interconnected segments 126 taper from $h_x$ to $h_o$ in the taper zone 192, the auxetic structure generally fades from fully visible auxetic cells to a flat surface in the taper zone 192. In the flat zone 194, the auxetic layer 120 provides a generally smooth, flat surface. In this flat zone 194, the height of the interconnected segments 126, $h_o$, may be considered to be the same as the height of the fill. As a result, a generally flat and smooth surface results in the flat zone. In the embodiment of FIGS. 8A-9C, the recess material is the same as the wall material such that the flat zone 194 is integral and provides a smooth continuous surface. Advantageously, because the outer perimeter of the auxetic layer 120 is where the upper 100 is connected to the sole 105, the flat zone 194 of the transition region 190 provides a consistent surface to receive adhesive as well as allow for stitching of the auxetic panel 118 to the sole.

While the invention has been described in detail and with reference to specific embodiments thereof, it will be apparent to one skilled in the art that various changes and modifications can be made therein without departing from the spirit and scope thereof. For example, while the embodiments disclosed herein show an article of apparel in the form of an article of footwear, and particularly a shoe, it will be recognized that the term "article of apparel" as used herein refers to any garment, article of footwear or accessory configured to be worn on or carried by a person (whether human or otherwise). Examples of articles of apparel include helmets, hats, caps, shirts, pants, shorts, sleeves, knee pads, elbow pads, shoes, boots, backpacks, duffel bags, cinch sacks, and straps, as well as numerous other products configured to be worn or carried by a person. Examples of other articles of footwear include socks, boots, cleats, or any of numerous other products configured to be worn in association with the foot of a person.

While the figures disclosed herein reference various regions of the article of footwear 10, including the forefoot region 110A, midfoot region 110B, and heel region 110C, it will be recognized that each of these regions generally corresponds to a region of a human foot associated with such region in the article of footwear 10. Furthermore, it will be recognized that overlap may occur between regions or that a transition region may be defined between each of these regions. Accordingly, when various portions of the upper 100 or sole assembly 105 are described herein as extending to different "regions", it will be recognized that these regions may be generally defined with reference to a human foot positioned within the associated article of footwear.

The components of the upper 100 may be presented in any of various configurations and thereby provide different forms of the footwear. For example, the upper 100 may be configured as a low-cut running shoe, a high-top basketball shoe, or any of various other forms of athletic shoes. The upper 100 may also be configured with various tightening mechanisms to secure the article of footwear 10 to the foot of the wearer. For example, the upper 100 may be configured such that the article of footwear is a lace-up shoe, a slip-on shoe, or a strap-tightened boot.

The foregoing detailed description of one or more exemplary embodiments of the articles of apparel including auxetic materials has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of apparel comprising:
a base layer; and
an auxetic layer coupled to the base layer, the auxetic layer comprising an auxetic structure defining a repeating pattern of perimeter walls and interior recesses, the auxetic layer including a first region and a second region, wherein each interior recess in the first region provides a void exposing the base layer, and wherein each interior recess in the second region is at least partially filled with a recess material.

2. The article of apparel of claim 1 wherein the base layer is a four way stretch material.

3. The article of apparel of claim 1 wherein the recess material is unitary in composition with the perimeter walls.

4. The article of apparel of claim 1 wherein the article of apparel is an article of footwear.

5. The article of apparel of claim 1 wherein the perimeter walls include a top surface and an opposite bottom surface, wherein the bottom surface faces the base layer, and wherein the recess material covers the base layer in each interior recess of the second region without extending to the top surface of the perimeter walls.

6. The article of apparel of claim 1 wherein the perimeter walls of the auxetic structure comprise a plurality of interconnected wall segments that form a repeating pattern of reentrant polygonal shapes.

7. The article of apparel of claim 1 wherein the auxetic structure has a Poisson's ratio of substantially zero or less than zero.

8. An article of apparel comprising:
a base layer; and
an auxetic structure coupled to the base layer, the auxetic structure including a plurality of interconnected members forming an array of cell units, each of the plurality of interconnected members forming cell walls with interior recesses defined within the cell walls, the array of cell units including at least one dynamic region wherein the interior recesses expose the base layer and at least one lockout region wherein a fill in the interior recesses covers the base layer.

9. The article of apparel of claim 8 wherein the base layer is a four way stretch material.

10. The article of apparel of claim 8 wherein the fill is unitary in composition with the interconnected members.

11. The article of apparel of claim 8 wherein the article of apparel is an article of footwear.

12. The article of apparel of claim 8 wherein the interconnected members include a top surface and an opposite bottom surface, wherein the bottom surface faces the base layer, and wherein the fill covers the base layer in each interior recess of the lockout region without extending to the top surface of the cell walls.

13. The article of apparel of claim 8 wherein the interconnected members of the auxetic structure comprise a plurality of wall segments that form a repeating pattern of reentrant polygonal shapes.

14. The article of apparel of claim 8 wherein the auxetic structure has a Poisson's ratio of substantially zero or less than zero.

15. An article of footwear comprising:
a sole; and
an upper connected to the sole, the upper including
a base layer; and
an auxetic layer connected to the base layer, the auxetic layer comprising an auxetic structure defining a repeating pattern of shapes, each of the shapes defined by perimeter walls with an interior recess provided within each shape, the auxetic layer including a first region and a second region, wherein each interior recess in the first region provides a void exposing the base layer, and wherein each interior recess in the second region is at least partially filled with a recess material.

16. The article of footwear of claim 15 wherein the perimeter walls define a top surface and an opposite bottom surface, wherein the bottom surface faces the base layer, and wherein the recess material covers the base layer in each interior recess without extending to the top surface of the perimeter walls in the second region.

17. The article of footwear of claim 15 wherein the perimeter walls are comprised of a wall material, wherein the wall material is integrally formed with the recess material in the second region.

18. The article of footwear of claim 15, the second region is provided in a toe region and a transition region of the upper extending along the perimeter of the sole.

19. The article of footwear of claim 15 wherein the repeating pattern of shapes is a repeating pattern of polygonal reentrant shapes and the auxetic structure has a Poisson's ratio of substantially zero or less than zero.

20. The article of footwear of claim 15 wherein the base layer comprises a four way stretch material.

* * * * *